US012583992B2

(12) United States Patent
Chinsoga et al.

(10) Patent No.: US 12,583,992 B2
(45) Date of Patent: Mar. 24, 2026

(54) COMPOSITE BODY

(71) Applicant: AGC Inc., Tokyo (JP)

(72) Inventors: Tamaki Chinsoga, Tokyo (JP); Mai Tasaka, Tokyo (JP)

(73) Assignee: AGC Inc., Tokyo (JP)

( * ) Notice: Subject to any disclaimer, the term of this patent is extended or adjusted under 35 U.S.C. 154(b) by 928 days.

(21) Appl. No.: 17/577,473

(22) Filed: Jan. 18, 2022

(65) Prior Publication Data

US 2022/0135759 A1      May 5, 2022

Related U.S. Application Data

(63) Continuation of application No. PCT/JP2020/037641, filed on Oct. 2, 2020.

(30) Foreign Application Priority Data

Oct. 4, 2019    (JP) ................................. 2019-183589
Apr. 23, 2020    (JP) ................................. 2020-076632

(51) Int. Cl.
*C08J 9/14*        (2006.01)
*C08J 9/00*        (2006.01)
*C08J 9/35*        (2006.01)

(52) U.S. Cl.
CPC ............. *C08J 9/144* (2013.01); *C08J 9/0061* (2013.01); *C08J 9/35* (2013.01); *C08J 2203/164* (2013.01); *C08J 2325/04* (2013.01); *C08J 2353/02* (2013.01); *C08J 2369/00* (2013.01); *C08J 2371/12* (2013.01)

(58) Field of Classification Search
CPC .......... B32B 5/18; B32B 5/24; B32B 27/065; B32B 27/285; B32B 27/30; B32B 27/302; B32B 27/308; B32B 27/32; B32B 27/34; B32B 27/36; B32B 27/365; B32B 27/40; B32B 27/42; B32B 2266/0214; B32B 2266/0228; B32B 2266/0235; B32B 2266/0242; B32B 2266/025; B32B 2266/0257; B32B 2266/0264; B32B 2266/0285; C08J 9/0061; C08J 9/141;

C08J 9/144; C08J 9/34; C08J 9/35; C08J 2203/14; C08J 2203/142; C08J 2203/162; C08J 2203/164; C08J 2203/182; C08J 2300/00

See application file for complete search history.

(56) References Cited

U.S. PATENT DOCUMENTS

| | | | | |
|---|---|---|---|---|
| 2010/0188833 A1* | 7/2010 | Liang | ................... | H05K 9/0088 |
| | | | | 252/502 |
| 2015/0299414 A1* | 10/2015 | Van Horn | ................ | C08J 9/142 |
| | | | | 521/146 |
| 2018/0134861 A1* | 5/2018 | Schilling | .............. | C08G 18/482 |
| 2019/0047453 A1* | 2/2019 | Sakakibara | .............. | A47C 7/20 |

FOREIGN PATENT DOCUMENTS

| | | | |
|---|---|---|---|
| JP | 2012-177108 A | | 9/2012 |
| JP | 2015-003425 A | | 1/2015 |
| JP | 2015-105342 A | | 6/2015 |
| JP | 2017-071780 A | | 4/2017 |
| JP | WO2019/088035 A1 | | 5/2019 |
| WO | WO 2019/036049 A1 | | 2/2019 |

OTHER PUBLICATIONS

JP2015003425 translation (Year: 2015).*
International Search Report issued Dec. 15, 2020 in PCT/JP2020/037641 filed on Oct. 2, 2020, 3 pages.

* cited by examiner

*Primary Examiner* — John M Cooney
(74) *Attorney, Agent, or Firm* — Oblon, McClelland, Maier & Neustadt, L.L.P.

(57) ABSTRACT

To provide a composite comprising a resin foam and a resin member different from the resin foam, which can suppress deterioration of the outer appearance of the resin member. A composite comprising a resin foam formed by using a blowing agent containing 1-chloro-2,3,3,3-tetrafluoropropene, and a resin member different from the resin foam, containing a resin selected from the group consisting of a polycarbonate resin, a polystyrene resin, a polyphenylene ether resin, an acrylonitrile/butadiene/styrene resin and a styrene/acrylonitrile copolymer resin.

20 Claims, 1 Drawing Sheet

COMPOSITE BODY

TECHNICAL FIELD

The present invention relates to a composite.

BACKGROUND ART

Foams are used in various fields as cushioning materials or packing materials utilizing their cushioning properties.

In production of foams, a blowing agent is used in many cases. Patent Document 1 discloses a method of expanding a polystyrene as one type of thermoplastic resin, using 1-chloro-3,3,3-trifluoropropene.

PRIOR ART DOCUMENTS

Patent Document

Patent Document 1: JP-A-2017-71780

DISCLOSURE OF INVENTION

Technical Problem

Foams are usually used in combination with other members in many cases. As other members, resin members constituted by a resin may be mentioned.

The present inventors have found that when a thermoplastic resin foam obtained by using 1-chloro-3,3,3-trifluoropropene disclosed in Patent Document 1 and a resin member containing a predetermined resin are used in combination and stored for a long term, deterioration of the outer appearance of the resin member such as discoloration or deformation occurs.

It is an object of the present invention to provide a composite comprising a resin foam and a resin member different from the resin foam, which can suppress deterioration of the outer appearance of the resin member.

Solution to Problem

The present inventors have conducted extensive studies to achieve the above object and as a result, found that the object can be achieved by the following constitution.

(1) A composite comprising a resin foam formed by using a blowing agent containing 1-chloro-2,3,3,3-tetrafluoropropene, and a resin member different from the resin foam, containing a resin selected from the group consisting of a polycarbonate resin, a polystyrene resin, a polyphenylene ether resin, an acrylonitrile/butadiene/styrene resin and a styrene/acrylonitrile copolymer resin.

(2) The composite according to (1), wherein 1-chloro-2,3,3,3-tetrafluoropropene is selected from the group consisting of (Z)-1-chloro-2,3,3,3-tetrafluoropropene and (E)-1-chloro-2,3,3,3-tetrafluoropropene, and the content of (Z)-1-chloro-2,3,3,3-tetrafluoropropene to the total mass of 1-chloro-2,3,3,3-tetrafluoropropene is 30 mass % or more.

(3) The composite according to (2), wherein the content of (Z)-1-chloro-2,3,3,3-tetrafluoropropene to the total mass of the 1-chloro-2,3,3,3-tetrafluoropropene is 75 mass % or more.

(4) The composite according to any one of (1) to (3), wherein the resin foam contains a thermosetting resin foam selected from the group consisting of a polyurethane foam, a polyisocyanurate foam and a phenolic resin foam.

(5) The composite according to any one of (1) to (3), wherein the resin foam contains a thermoplastic resin foam containing at least one member selected from the group consisting of a polycarbonate resin, a polystyrene resin, a polyphenylene ether resin, an acrylonitrile/butadiene/styrene resin, a polyolefin resin, a polyvinyl chloride resin, a (meth)acrylic resin, a polyester resin, a modified polyphenylene ether resin, a polyacetal resin, a polyether imide resin, a polyethersulfone resin, a polyamide resin, a polysulfone resin, a polyether ether ketone resin and a polyether ketone resin.

(6) The composite according to any one of (1) to (5), which contains two types of the resin foams.

(7) The composite according to any one of (1) to (6), wherein the resin foam contains two or more types of the resins.

(8) The composite according to any one of (1) to (7), wherein the blowing agent further contains at least one compound selected from the group consisting of a hydrofluoroolefin, a hydrochlorofluoroolefin (excluding 1-chloro-2,3,3,3-tetrafluoropropene), a hydrochloroolefin, a chlorofluoroolefin, a fluoroolefin, a chloroolefin, an olefin, a hydrofluorocarbon, a hydrochlorocarbon, a hydrochlorofluorocarbon, a chlorofluorocarbon, a fluorocarbon, a chlorocarbon, a hydrocarbon, a hydrofluoroether, carbon dioxide, an organic acid, an alcohol, an ether, an aldehyde, a ketone, water and nitrogen.

(9) The composite according to any one of (1) to (8), wherein the blowing agent contains at least one member selected from the group consisting of 1-chloro-3,3,3-trifluoropropene, 1,1,1,4,4,4-hexafluoro-2-butene, 1,3,3,3-tetrafluoropropene, cyclopentane, n-pentane, isopentane, isobutane, n-butane, trans-1,2-dichloroethylene, carbon dioxide and nitrogen.

Advantageous Effects of Invention

According to the present invention, it is possible to provide a composite comprising a resin foam and a resin member different from the resin foam, which can suppress deterioration of the outer appearance of the resin member.

DESCRIPTION OF EMBODIMENTS

Figure 1:
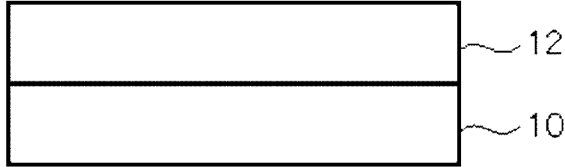
FIG. 1 is a view schematically illustrating an example of the resin foam and the resin member in the composite.

Meanings of terms used in the present invention are as follows.

The range of the numerical values represented by "to" includes the numerical values before and after it as the lower limit value and the upper limit value.

In this specification, abbreviated names of halogenated hydrocarbon compounds are described in parentheses after the compound names, and the abbreviated names are employed instead of the compound names as the case requires. Further, as abbreviated names, only numerals and small alphabet letters after a hyphen (-) may be used (for example, "1224yd" for "HCFO-1224yd"). Further, in this specification, unless otherwise specified, a compound name or an abbreviated name of the compound name means at least one member selected from a Z-form and an E-form, more specifically, a Z-form, an E-form or a mixture of a Z-form and an E-form at an optional ratio. A compound name or an abbreviated name of a compound denoted by (E) or (Z) after the compound name or the abbreviated name of the compound means an E-form or a Z-form of the compound. For example, 1224yd(Z) means a Z-form, and 1224yd(E) means an E-form.

In this specification, a hydrofluoroolefin is a compound composed of carbon atoms, hydrogen atoms and fluorine atoms and having a double bond.

In this specification, a hydrochlorofluoroolefin is a compound composed of carbon atoms, hydrogen atoms, fluorine atoms and chlorine atoms and having a double bond.

In this specification, a hydrochloroolefin is a compound composed of carbon atoms, hydrogen atoms and chlorine atoms and having a double bond.

In this specification, a chlorofluoroolefin is a compound composed of carbon atoms, fluorine atoms and chlorine atoms and having a double bond.

In this specification, a fluoroolefin is a compound composed of carbon atoms and fluorine atoms and having a double bond.

In this specification, a chloroolefin is a compound composed of carbon atoms and chlorine atoms and having a double bond.

In this specification, a hydrofluorocarbon is a compound composed of carbon atoms, hydrogen atoms and fluorine atoms and having no unsaturated bond (e.g. a double bond or a triple bond).

In this specification, a hydrochlorocarbon is a compound composed of carbon atoms, hydrogen atoms and chlorine atoms and having no unsaturated bond (e.g. a double bond or a triple bond).

In this specification, a hydrochlorofluorocarbon is a compound composed of carbon atoms, hydrogen atoms, fluorine atoms and chlorine atoms and having no unsaturated bond (e.g. a double bond or a triple bond).

In this specification, a chlorofluorocarbon is a compound composed of carbon atoms, fluorine atoms and chlorine atoms and having no unsaturated bond (e.g. a double bond or a triple bond).

In this specification, a fluorocarbon is a compound composed of carbon atoms and fluorine atoms and having no unsaturated bond (e.g. a double bond or a triple bond).

In this specification, a chlorocarbon is a compound composed of carbon atoms and chlorine atoms and having no unsaturated bond (e.g. a double bond or a triple bond).

In this specification, a hydrofluoroether is a compound composed of carbon atoms, hydrogen atoms, fluorine atoms and an etheric oxygen atom and having no unsaturated bond (e.g. a double bond or a triple bond).

The composite of the present invention is characterized by using a resin foam formed by using 1-chloro-2,3,3,3-tetrafluoropropene ($CF_3$—$CF$=$CHCl$, HCFO-1224yd) as a blowing agent.

The detailed mechanism as to why the effects of the present invention are obtained is not clearly understood, but is estimated as follows.

In a case where a resin foam obtained by using 1-chloro-3,3,3-trifluoropropene as disclosed in Patent Document 1 and a specific resin member different from the resin foam are used in combination, as a reason of the deterioration of the outer appearance of the resin member different from the resin foam, influences of 1-chloro-3,3,3-trifluoropropene are considered. That is, it is considered that a resin foam obtained by using 1-chloro-3,3,3-trifluoropropene, 1-chloro-3,3,3-trifluoropropene remains e.g. in pores even after formation of the resin foam, and the remaining 1-chloro-3,3,3-trifluoropropene influences the specific resin member different from the resin foam as the time passes and causes the deterioration of the outer appearance.

Whereas in the case of a resin foam formed by using 1224yd as a blowing agent used in the present invention, it is considered that even if 1224yd remains e.g. in pores in the resin foam, 1224yd itself is relatively hardly soluble in the resin member and as a result, deterioration of the outer appearance of the resin member different from the resin foam used in combination is suppressed.

The composite of the present invention comprises a resin foam formed by using a blowing agent containing 1224yd and a resin member different from the resin foam containing a specific resin (hereinafter sometimes referred to simply as "resin member") Now, the members contained in the composite will be described in detail.

<Resin Foam>

The resin foam is a form composed of a resin, formed by using a blowing agent containing 1224yd.

The resin foam contains at least one type of resin. The resin foam may contain one type of resin or may contain two or more types of resins.

As the resin foam, a thermoplastic resin foam and a thermosetting resin foam may be mentioned.

The thermoplastic resin foam is a foam formed by using a thermoplastic resin and a blowing agent containing 1224yd. That is, it is a foam containing a thermoplastic resin.

Further, the thermosetting resin foam is a foam formed by using a thermosetting resin and a blowing agent containing 1224yd.

(Thermoplastic Resin Foam)

As specific examples of the thermoplastic resin contained in the thermoplastic resin foam, a polycarbonate resin, a polystyrene resin, a polyphenylene ether resin, an acrylonitrile/butadiene/styrene resin, a polyolefin resin, a polyvinyl chloride resin, a (meth)acrylic resin, a polyester resin, a modified polyphenylene ether resin, a polyacetal resin, a polyether imide resin, a polyethersulfone resin, a polyamide resin, a polysulfone resin, a polyether ether ketone resin and a polyether ketone resin may be mentioned.

As specific examples of the polyolefin resin, a polyethylene resin and a polypropylene resin may be mentioned. The polyolefin resin may be an amorphous polyolefin resin or may be a crystalline polyolefin resin.

As specific examples of the polyester resin, a polyethylene terephthalate resin, a polybutylene terephthalate resin, a wholly aromatic polyester resin and a polyarylate resin may be mentioned.

The modified polyphenylene ether resin is a polymer alloy of a polyphenylene ether resin and other thermoplastic resin (e.g. a polystyrene resin).

As the thermoplastic resin, in view of more excellent heat resistance of the foam, a low density polyethylene resin, a high density polyethylene resin, a polypropylene resin, a flexible polyvinyl chloride resin, a rigid polyvinyl chloride resin, a polystyrene resin, an acrylonitrile/butadiene/styrene resin or a polycarbonate resin is preferred.

The low density polyethylene is a polyethylene having a density (g/cm$^3$) of 0.910 or higher and less than 0.930, and the high density polyethylene is a polyethylene having a density (g/cm$^3$) of 0.942 or higher.

The flexible polyvinyl chloride is a polyvinyl chloride having a content of a plasticizer (e.g. a phthalate) of 10 mass % or more to the total amount, and the rigid polyvinyl chloride resin is a polyvinyl chloride having a content of a plasticizer (e.g. a phthalate) of 1 mass % or less to the total amount.

The thermoplastic resin may be used alone or may be used in combination of two or more.

For example, when two or more types of thermoplastic resins are used, the two or more types of thermoplastic resins are mixed, and the mixture is expanded by using the blowing agent.

(Thermosetting Resin Foam)

As specific examples of the thermosetting resin foam, a polyurethane foam, a polyisocyanurate foam and a phenolic resin foam may be mentioned.

The polyurethane foam is a resin foam obtained by mixing a polyol having two or more hydroxy groups and a polyisocyanate having two or more isocyanate groups with a blowing agent containing 1224yd so that foaming reaction and resin forming reaction proceed simultaneously.

As the polyurethane foam, a flexible polyurethane foam, a semi-rigid polyurethane foam, a rigid polyurethane foam and an integral skin foam may be mentioned.

The flexible polyurethane foam is a foam in which cells are connected to one another, is usually a light-weight plastic foam having an expansion ratio of from about 10 to about 60, an apparent density at a level of from 16 to 100 kg/m³, and is flexible and restorable.

The rigid polyurethane foam is a foam in which cells are closed. Accordingly, when a gas which hardly transmits heat is sealed in the cells, such a rigid urethane foam maintains excellent heat insulating performance over a long period of time.

The semi-rigid polyurethane foam is a material between the rigid polyurethane foam and the flexible polyurethane foam, in which both open cells and closed cells are present.

The integral skin foam is a foam comprising a core portion having cushion properties with a relatively low density and a skin portion having high durability with a relatively high density, disposed at the surface of the foam connected to the core portion.

As the polyurethane foam, the rigid polyurethane foam is preferred. In the case of the rigid polyurethane foam, the average number of hydroxy groups in the polyol is preferably from 2 to 8, more preferably from 2.5 to 7.5. When it is at least the lower limit of the above range, the compressive strength of the obtainable foam will improve, and shrinkage can be suppressed and the dimensional stability tends to be good. When it is at most the upper limit of the above value, the viscosity of the polyol will not be too high, and fluidity and forming property at the time of expansion and forming tend to be good. The average number of hydroxy groups in the polyol is a molar average of the number of hydroxy groups in all the polyols contained.

The weight average molecular weight (Mw) of the polyol is preferably from 100 to 3000, more preferably from 150 to 2000. When Mw is at most the upper limit of the average range, shrinkage of the obtainable foam will be suppressed, and dimensional stability tends to be good. When Mw is at least the lower limit of the above range, the obtainable foam tends to be hardly fragile. Mw of the polyol is the average of Mws of all the polyols contained.

The average hydroxy value of the polyol is preferably from 100 to 800 mg KOH/g, more preferably from 200 to 700 mg KOH/g, further preferably from 300 to 600 mg KOH/g. When the average hydroxy value is at least the lower limit of the above range, shrinkage of the obtainable foam will be suppressed, and dimensional stability tends to be good. When the average hydroxy value is at most the upper limit, the obtainable foam tends to hardly be fragile. The average hydroxy value of the polyol may be weighted average of hydroxy values of all polyols contained, or may be measured with respect to a mixture of all polyols contained.

As specific examples of the polyol, a polyether polyol, a polyester polyol, a polycarbonate polyol, a polyol comprising a main chain composed of a hydrocarbon polymer and having a hydroxy group introduced to the terminal moiety, and a polyhydric alcohol may be mentioned. As the polyol, a polyester ether polyol or a polycarbonate polyol may also be used.

The polyol may be used alone or may be used in combination of two or more.

As specific examples of the polyisocyanate, e.g. an aromatic, alicyclic or aliphatic polyisocyanate having two or more isocyanate groups, or a modified polyisocyanate obtained by modifying such a polyisocyanate, may be mentioned.

More specifically, polyisocyanates such as tolylene diisocyanate, diphenylmethane diisocyanate, polymethylenepolyphenylene polyisocyanate (polymeric MDI), xylylene diisocyanate, isophorone diisocyanate and hexamethylene diisocyanate, and modified products thereof may be mentioned.

As specific examples of the modified products, prepolymer modified products, isocyanurate modified products, urea modified products and carbodiimide modified products may be mentioned. Among them, in view of reactivity and the strength of the obtainable foam, polymeric MDI or its modified product is preferred, and a modified product of polymeric MDI is more preferred.

The polyisocyanate may be used alone or may be used in combination.

The amount of the polyisocyanate used is, in view of reactivity, preferably from 50 to 300, as a value obtained by multiplying the number of isocyanate groups to the total number of active hydrogen atoms in the polyol and other compound having active hydrogen, by 100.

The polyisocyanurate foam is a polyurethane foam having an isocyanurate ring formed by using a blowing agent containing 1224yd.

The phenolic resin foam is a resin foam obtained by mixing phenol and an aldehyde with a blowing agent containing 1224yd so that foaming reaction and resin forming reaction proceed simultaneously.

(Blowing Agent)

The blowing agent contains 1224yd. 1224yd may be (Z)-1-chloro-2,3,3,3-tetrafluoropropene (1224yd(Z)) alone, may be (E)-1-chloro-2,3,3,3-tetrafluoropropene (1244yd (E)) alone, or may be a mixture of 1224yd(Z) and 1224yd (E).

In the blowing agent, the molar ratio of the content of 1224yd(E) to the content of 1224yd(Z) (molar amount of 1224yd(E)/molar amount of 1224yd(Z)) may be from 0/100 to 100/0.

Particularly, the content of 1224yd(Z) to the total mass of 1224yd (total mass of 1224yd(Z) and 1224yd(E)) is preferably 30 mass % or more, more preferably 75 mass % or more, further preferably 90 mass % or more, particularly preferably 95 mass % or more, most preferably 99 mass % or more. The upper limit is preferably 99.9 mass %, preferably substantially 100 mass %.

When the content of 1224yd(Z) is 30 mass % or more (preferably 75 mass % or more), decomposition and oxidation of 1224yd will further be suppressed. When the content of 1224yd(Z) is 30 mass % or more, deterioration of the outer appearance of the resin member will further be suppressed.

As the blowing agent, 1224yd may be used alone, or 1224yd may be used in combination with other blowing agent.

As other blowing agent, a known blowing agent may properly be used. As a known blowing agent, either so-called chemical blowing agent or physical blowing agent may be used.

As specific examples of other blowing agent, as chemical blowing agents, inorganic chemical blowing agents such as sodium bicarbonate and ammonium carbonate, organic chemical blowing agents such as azodicarbonamide, N,N'-dinitropentamethylenetetramine, 4,4'-oxybis(benzenesulfonylhydrazide) and azobisisobutyronitrile, and water may be mentioned.

As physical blowing agents, a hydrofluoroolefin, a hydrochlorofluoroolefin (excluding 1-chloro-2,3,3,3-tetrafluoropropene), a hydrochloroolefin, an olefin, a chlorofluoroolefin, a fluoroolefin, a chloroolefin, a hydrofluorocarbon, a hydrochlorocarbon, a hydrochlorofluorocarbon, a chlorofluorocarbon, a fluorocarbon, a chlorocarbon, a hydrocarbon, a hydrofluoroether, carbon dioxide, an organic acid, an alcohol, an ether, an aldehyde, a ketone and nitrogen may be mentioned.

As specific examples of the hydrofluoroolefin, 1,3,3,3-tetrafluoropropene (HFO-1234ze), 1,1,2,3-tetrafluoropropene (HFO-1234yc), 2,3,3,3-tetrafluoropropene (HFO-1234yf), 1,1,2,3,3-pentafluoropropene (HFO-1225yc), 1,1,3,3,3-pentafluoropropene (HFO-1225zc), 3,3,3-trifluoropropene (HFO-1243zf), 3,3-difluoropropene (HFO-1252zf), 2-fluoropropene (HFO-1261yf), 1,1,1,4,4,4-hexafluoro-2-butene (HFO-1336mzz), 2,3,3,4,4,4-hexafluoro-1-butene (HFO-1336mcyf), 1,3,3,4,4,4-hexafluoro-1-butene (HFO-1336ze), tetrafluorobutene (HFO-1354), 1,1,1,2,4,4,5,5,5-nonafluoropentene (HFO-1429myz), 1,1,1,4,4,5,5,5-octafluoropent-2-ene (HFO-1438mzz), 1,3,4,4,4-pentafluoro-3-trifluoromethyl-1-butene (HFO-1438ezy), $(C_2F_5)(CF_3)C$=$CH_2$, $(CF_3)_2CFCH$=$CF_2$, $(CF_3)_2CFCF$=$CHF$, 1,1-difluoroethylene (HFO-1132a), 1,1,2-trifluoroethylene (HFO-1123) and 1,2,3,3,3-pentafluoro-1-propene (HFO-1225ye) may be mentioned.

As specific examples of the hydrochlorofluoroolefin (excluding 1224yd), 2,3,3-trichloro-3-fluoropropene (HCFO-1231xf), 2,3-dichloro-3,3-difluoropropene (HCFO-1232xf), 2,3-dichloro-3,3-difluoropropene (HCFO-1232xf), 1,2-dichloro-3,3,3-trifluoropropene (HCFO-1223xd), 2-chloro-3,3,3-trifluoropropene (HCFO-1233xf), 1-chloro-3,3,3-trifluoropropene (HCFO-1233zd), 2-chloro-1,3,3,3-tetrafluoropropene (HCFO-1224xc), 2-chloro-1,3,3,3-tetrafluoropropene (HCFO-1224xe), 1,1-dichloro-2-fluoroethylene (HCFO-1121a), 1,2-dichloro-1-fluoroethylene (HCFO-1121), 1-chloro-1-fluoroethylene (HCFO-1131a), 1-chloro-2-fluoroethylene (HCFO-1131), 1-chloro-2,2-difluoroethylene (HCFO-1122) and 1,1,2-trifluoro-2-chloroethylene (HCFO-1113) may be mentioned.

As specific examples of the hydrochloroolefin, chloroethylene and 1,2-dichloroethylene may be mentioned.

As specific examples of the chlorofluoroolefin, 1,1-dichloro-2,3,3,3-tetrafluoropropene (CFO-1214ya), 1,1,2-trichloro-2-fluoroethylene and 2-chloro-1,1,3,3,3-pentafluoro-1-propene (CFO-1215xc) may be mentioned.

As specific examples of the fluoroolefin, hexafluoropropene (FO-1216) and octafluoro-2-butene (FO-1318my) may be mentioned.

As specific examples of the chloroolefin, tetrachloroethylene may be mentioned.

As specific examples of the olefin, ethylene and propylene may be mentioned.

As specific examples of the hydrofluorocarbon, 1,1,1,3,3-pentafluoropropane (HFC-245fa), 1,1,1,2,2-pentafluoropropane (HFC-245cb), 1,1,2,2,3-pentafluoropropane (HFC-245ca), 1,1,1,2,3-pentafluoropropane (HFC-245eb), 1,1,1,2,3,3,3-heptafluoropropane (HFC-227ea), 1,1,1,2-tetrafluoropropane (HFC-254eb), 1,1,1,3-tetrafluoropropane (HFC-254fb), 1,1,1-trifluoropropane (HFC-263fb), 1,1,1,2,3,3-hexafluoropropane (HFC-236ea), 1,1,1,3,3,3-hexafluoropropane (HFC-236fa), 2-fluoropropane (HFC-281ea), 1,1,2,2-tetrafluoroethane (HFC-134), 1,1,1,2-tetrafluoroethane (HFC-134a), 1,2-difluoroethane (HFC-152), 1,1-difluoroethane (HFC-152a), difluoromethane (HFC-32), 1,1,1,2,2-pentafluoroethane (HFC-125), 1,1,2-trifluoroethane (HFC-143), 1,1,1-trifluoroethane (HFC-143a), 1,1,1,3,3-pentafluorobutane (HFC-365mfc), fluoroethane (HFC-161), 1,1,1,2,2,3,4,5,5,5-decafluoropentane (HFC-43-10mee), trifluoromethane (HFC-23) and fluoromethane (HFC-41) may be mentioned.

As specific examples of the hydrochlorocarbon, chloroform, 1,1,1,2,3-pentachloropropane (HCC-240db) and 2-chloropropane may be mentioned.

As specific examples of the hydrochlorofluorocarbon, chlorodifluoromethane (HCFC-22), chlorofluoromethane (HCFC-31), trichlorodifluoroethane (HCFC-122), 1,1,2-trichloro-1,2-difluoroethane (HCFC-122a), 1,1,1-trichloro-2,2-difluoroethane (HCFC-122b), 2,2-dichloro-1,1,1-trifluoroethane (HCFC-123), 2-chloro-1,1,1,2-tetrafluoroethane (HCFC-124), 1-chloro-1,1,2,2-tetrafluoroethane (HCFC-124a), 2-chloro-1,1,1-trifluoroethane (HCFC-133a), 1,1-dichloro-1-fluoroethane (HCFC-141b), 1,1-difluoro-2-chloroethane (HCFC-142), 1-chloro-1,2-difluoroethane (HCFC-142a), 1-chloro-1,1-difluoroethane (HCFC-142b), 3,3-dichloro-1,1,1,2,2-pentafluoropropane (HCFC-225ca), 1,3-dichloro-1,1,2,2,3-pentafluoropropane (HCFC-225cb), 2,2-dichloro-1,1,1-trifluoropropane (HCFC-243ab), 2,3-dichloro-1,1,1-trifluoropropane (HCFC-243db) and 2-chloro-1,1,1,2-tetrafluoropropane (HCFC-244bb) may be mentioned.

As specific examples of the chlorofluorocarbon, trichlorofluoromethane (CFC-11), dichlorodifluoromethane (CFC-12), chlorotrifluoromethane (CFC-13), trichlorotrifluoroethane (CFC-113), 1,2-dichloro-1,1,2,2-tetrafluoroethane (CFC-114), 1,1-dichloro-1,2,2,2-tetrafluoroethane (CFC-114a), chloropentafluoroethane (CFC-115), dichlorohexafluoropropane (CFC-216), 2,2,3,3-tetrachlorohexafluorobutane (CFC-316) and dichlorooctafluorobutane (CFC-318) may be mentioned.

As specific examples of the fluorocarbon, 1,1,1,2,2,2-hexafluoroethane (FC-116), octafluoropropane (FC-218) and 1,1,1,2,2,3,3-heptafluoropropane (FC-227ca) may be mentioned.

As specific examples of the hydrocarbon, methane, ethane, propane, n-butane, isobutane, n-pentane, isopentane, neopentane, cyclopentane, n-hexane, isohexane and heptane may be mentioned.

As specific examples of the hydrofluoroether, $CHF_2$—O—$CHF_2$, $CHF_2$—O—$CH_2F$, $CH_2F$—O—$CH_2F$, $CH_2F$—O—$CH_3$, cyclo-$CF_2$—$CH_2$—$CF_2$—O, cyclo-$CF_2$—$CF_2$—$CH_2$—O, $CHF_2$—O—$CF_2$—$CHF_2$, $CF_3$—$CF_2$—O—$CH_2F$, $CHF_2$—O—$CHF$—$CF_3$, $CHF_2$—O—$CF_2$—$CHF_2$, $CH_2F$—

O—$CF_2$—$CHF_2$, $CF_3$—O—$CF_2$—$CH_3$, $CHF_2$—CHFO—$CHF_2$, $CF_3$—O—CHF—$CH_2F$, $CF_3$—CHF—O—$CH_2F$, $CF_3$—O—$CH_2$—$CHF_2$, $CHF_2$—O—$CH_2$—$CF_3$, $CHF_2$—$CF_2$—O—$CH_2F$, $CHF_2$—O—$CF_2$—$CH_3$, $CHF_2$—$CF_2$—O—$CH_3$, $CHF_2$—$CF_2$—O—$CH_3$, $CH_2F$—O—CHF—$CH_2F$, $CHF_2$—CHF—O—$CH_2F$, $CF_3$—O—CHF—$CH_3$, $CF_3$—CHF—O—$CH_3$, $CHF_2$—O—$CH_2$—$CHF_2$, $CF_3$—O—$CH_2$—$CH_2F$, $CF_3$—$CH_2$—O—$CH_2F$, $CF_2H$—$CF_2$—$CF_2$—O—$CH_3$, $CF_3CF_2CF_2$—O—$CH_3$ and $C_4H_9$—O—$CH_3$ may be mentioned.

As specific examples of the alcohol, methanol, ethanol, propanol and isopropanol may be mentioned.

As specific examples of the ether, dimethyl ether, methyl ethyl ether, diethyl ether, methyl propyl ether, methyl isopropyl ether, ethyl propyl ether, ethyl isopropyl ether, dipropyl ether, diisopropyl ether, dimethoxymethane, diethoxyethane, dipropoxymethane and dibutoxymethane may be mentioned.

As specific examples of the aldehyde, formaldehyde, acetaldehyde, propanal, butanal and isobutanal may be mentioned.

As specific examples of the ketone, ketone, methyl ethyl ketone, methyl isobutyl ketone and perfluoroethyl isopropyl ketone may be mentioned.

As specific examples of the organic acid, methyl formate, ethyl formate and formic acid may be mentioned.

In the above, other blowing agents contained in the blowing agent are mentioned, however, other blowing agent is not limited to the above, and a blowing agent other than the above (for example, 1-chloro-3,3,3-trifluoro-1-propine ($CF_3$—C≡CCl)) may be used.

The blowing agent preferably further contains, together with 1224yd, at least one compound (hereinafter sometimes referred to as "compound X") selected from the group consisting of a hydrofluoroolefin, a hydrochlorofluoroolefin (excluding 1-chloro-2,3,3,3-tetrafluoropropene), a hydrochloroolefin, an olefin, a chlorofluoroolefin, a fluoroolefin, a chloroolefin, a hydrofluorocarbon, a hydrochlorocarbon, a hydrochlorofluorocarbon, a chlorofluorocarbon, a fluorocarbon, a chlorocarbon, a hydrocarbon, a hydrofluoroether, carbon dioxide, an organic acid, an alcohol, an ether, an aldehyde, a ketone, water and nitrogen.

As the compound X, in view of more excellent heat insulating property of the foam, with a view to improving the solubility of the blowing agent to adjust the expansion property, or in view of availability and cost, more preferred is at least one member selected from the group consisting of 1-chloro-3,3,3-trifluoropropene, 1,1,1,4,4,4-hexafluoro-2-butene, 1,3,3,3-tetrafluoropropene, cyclopentane, n-pentane, isopentane, isobutane, n-butane, trans-1,2-dichloroethylene, carbon dioxide and nitrogen.

The compound Z may be used alone or in combination of two or more.

The amount of the blowing agent containing 1224yd used may properly be set depending upon the expansion ratio of the final product, the type of the blowing agent and the resin temperature at the time of forming and is not particularly limited, and is preferably from 0.2 to 30 parts by mass, more preferably from 1 to 15 parts by mass per 100 parts by mass of the resin material (for example, the thermoplastic resin or the thermosetting resin).

The content of 1224 yd in the blowing agent is not particularly limited, and is preferably from 1 to 100 mass %, more preferably from 20 to 100 mass %, further preferably from 30 to 100 mass %, particularly preferably from 50 to 100 mass %, most preferably from 70 to 100 mass %, to the total mass of the blowing agent.

In a case where the compound X is used, the amount of the compound X used is not particularly limited, and is preferably 1 mass % or more, more preferably 5 mass % or more, further preferably 10 mass % or more, to the total mass of 1224yd and the compound X. Further, it is preferably 95 mass % or less, more preferably 80 mass % or less, further preferably 70 mass % or less, particularly preferably 40 mass % or less, most preferably 30 mass % or less.

In a case where the compound X is used, the amount of 1224yd used is not particularly limited and is preferably 5 mass % or more, more preferably 20 mass % or more, further preferably 30 mass % or more, particularly preferably 60 mass % or more, most preferably 70 mass % or more, to the total mass of 1224yd and the compound X. Further, it is preferably 99 mass % or less, more preferably 95 mass % or less, further preferably 90 mass % or less.

Particularly when 1-chloro-3,3,3-trifluoropropene, 1,1,1,4,4,4-hexafluoro-2-butene, 1,3,3,3-tetrafluoropropene, cyclopentane, n-pentane, isopentane, isobutane, n-butane, trans-1,2-dichloroethylene, carbon dioxide or nitrogen is used as the compound X, to the total mass of 1224yd and the compound X, the amount of the compound X used is preferably 1 mass % or more, more preferably 10 mass % or more, and is preferably 95 mass % or less, more preferably 90 mass % or less, further preferably 80 mass % or less, particularly preferably 70 mass % or less, most preferably 40 mass % or less, and most particularly preferably 30 mass % or less.

(Method for Producing Resin Foam)

As a method for producing the resin foam, a known method may be used, and usually, a method for producing the resin foam using the blowing agent containing 1224yd and the resin material (for example, the thermoplastic resin or the thermosetting resin) may be mentioned.

In the following, a method for producing a thermosetting resin foam and a method for producing a thermoplastic resin foam will be described separately.

In production of a polyurethane foam as the thermosetting resin foam, the polyisocyanate and the polyol are mixed with the blowing agent containing 1224yd so that the polyisocyanate and the polyol are reacted and expanded.

The amount of the blowing agent used is, per 100 parts by mass of the polyol, preferably from 10 to 100 parts by mass, more preferably from 12 to 60 parts by mass, further preferably from 15 to 50 parts by mass.

Further, in production of the polyurethane foam, a foam stabilizer or a catalyst may be used.

The foam stabilizer is used to form favorable cells.

The foam stabilizer may, for example, be a silicone foam stabilizer or a fluorinated compound foam stabilizer. As the foam stabilizer, commercial products may be used.

The amount of the foam stabilizer used may be properly selected, and the ratio is preferably from 0.1 to 10 parts by mass per 100 parts by mass of the polyol, whereby more favorable cells are likely to be formed.

As the catalyst, a urethane-forming catalyst which promotes the urethane-forming reaction may be used.

As the urethane-forming catalyst, in view of reactivity, a tertiary amine is preferred.

As specific examples of the tertiary amine, N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7-triethylenediamine, N,N,N',N'-tetramethylhexamethylenediamine, N,N'-dimethylpiperazine, dimethylcyclohexylamine, N-methylmorpholine, N-ethylmorpholine, bis(2-dimethylaminoethyl) ether, 1-methylimidazole, 1,2-dimethylimidazole, 1-isobutyl-2-methylimidazole, 1-dimethylaminopropylimidazole, and N-methyl-N—(N,N-dimethylaminoethyl)ethanolamine may be mentioned.

As the case requires, components other than the above may further be used.

As other component, a known compounding ingredient may be used. As specific examples of the known compounding ingredient, a filler, an age resistor, a flame retardant, a plasticizer, a coloring agent, a fungicide, a cell opener, a dispersing agent, and a discoloration preventing agent may be mentioned. As specific examples of the filler, calcium carbonate and barium sulfate may be mentioned. As specific examples of the age resistor, an antioxidant and an ultraviolet absorber may be mentioned.

The amount of the above other component used may be properly selected depending upon the application, and is preferably from 0.1 to 30 parts by mass per 100 parts by mass of the polyol.

The amount of the catalyst used is, in view of reactivity, per 100 parts by mass of the polyol, preferably from 0.1 to 100 parts by mass, more preferably from 0.1 to 20 parts by mass. By adjusting the amount of the catalyst used within the above range, the time from the start of mixing of components used for expansion until the start of the reaction (cream time), the time from the start of the mixing until the start of curing of the resin (gel time), or the time from the start of the mixing until completion of curing of the resin (tack free time) can favorably be adjusted.

Further, in production of a polyisocyanurate foam as the thermosetting resin foam, in the same manner as the production of the polyurethane foam, the polyisocyanate and the polyol are mixed with the blowing agent containing 1224yd so that the polyisocyanate and the polyol are reacted and expanded.

In production of the polyisocyanurate foam, a trimerization promoting catalyst to promote the trimerization of isocyanate groups is preferably used.

As the trimerization promoting catalyst, in view of reactivity, an organic acid metal salt excluding a tin salt, a lead salt and a mercury salt, a quaternary ammonium salt, or a combination of the above metal salt and the quaternary ammonium salt is preferred.

As specific examples of the organic acid metal salt excluding a tin salt, a lead salt and a mercury salt, in view or reactivity, preferred are carboxylic acid metal salts such as potassium acetate, potassium 2-ethylhexanoate and bismuth 2-ethylhexanoate.

As specific examples of the quaternary ammonium salt, tetraalkylammonium halides such as tetramethylammonium chloride; tetraalkylammonium hydroxides such as tetramethylammonium hydroxide; tetraalkylammonium organic acid salts such as tetramethylammonium 2-ethylhexanoate, 2-hydroxypropyltrimethylammonium formate and 2-hydroxypropyltrimethylammonium 2-ethylhexanoate; and quaternary ammonium compounds obtained by subjecting a quaternary ammonium carbonate obtained by reacting a tertiary amine such as N,N,N',N'-tetramethylethylenediamine and a carbonic acid diester to anion exchange reaction with 2-ethylhexanoate, may be mentioned.

As a specific method for protruding the thermosetting resin foam, for example, so-called injection molding method of injecting the raw material into a frame such as a mold and expanding the raw material; a so-called continuous board method of supplying the raw material between two face materials and expanding the raw material to produce a laminate having the thermosetting resin foam sandwiched between the two face materials; and so-called spraying method of spraying the raw material, may be mentioned.

As the conditions for the production method, optimum conditions are properly selected depending upon the types of the thermosetting resin and the blowing agent used.

The method of expanding the thermoplastic resin using the blowing agent containing 1224yd to produce a foam is not limited and may, for example, be extrusion expansion method, injection expansion method, expansion blow method, bead expansion method or press expansion method.

The extrusion expansion method is a method of melting and kneading the thermoplastic resin and the blowing agent in an extruder and extruding the melt from an extrusion outlet at the tip of the extruder into the air for expansion.

The injection expansion method is a method of charging the thermoplastic resin and the blowing agent into an injection machine and injecting the melt into a mold to obtain a foam in the mold.

The expansion blow method is a method of sandwiching a parison containing the thermoplastic resin and the blowing agent extruded from an extruder by a mold and blowing air into the parison to form the parison into a desired shape thereby to obtain a foam. The bead expansion method is a method of preparing particles of the thermoplastic resin, impregnating the particles with the blowing agent under elevated pressure, and expansion the particles by a change of the temperature or the pressure to prepare foam particles, and further conducing in-mold expansion to obtain a foam.

The press expansion method is a method of putting a sheet containing the thermoplastic resin and the blowing agent into a mold of a hot press and conducting expansion to obtain a foam.

1224yd corresponds to the so-called physical blowing agent, and as the method of mixing with the thermoplastic resin and the timing of use, the same embodiments as for known physical blowing agents may be mentioned.

As the above production method, an optimum method is selected depending upon the application of the thermoplastic resin, and for example, for production of building heat insulating materials using the polyisocyanate resin as the thermoplastic resin, the extrusion expansion method or the bead expansion method is preferably selected, and for production of automobile interior members using the polyolefin resin (particularly the polyethylene resin or the polypropylene resin) as the thermoplastic resin, the injection expansion method is preferably selected.

As the conditions of the above production method, optimum conditions are properly selected depending upon the type of the thermoplastic resin and the blowing agent used.

As specific examples of the shape of the resin foam, a sheet, a plate, a rod, a tube, spheres (beads), and a combination thereof may be mentioned. A sheet means a thickness of 1000 μm or less, and a plate means a thickness of more than 1000 μm.

As the density of the resin foam, an optimum density is selected depending upon the application, and the density is from 0.02 to 0.96 $g/cm^3$ in many cases.

The density is a value measured in accordance with JIS K7222.

As the average cell size of the resin foam, an optimum value is selected depending upon the application, and it is from 10 to 1200 μm in many cases.

The average cell size of the resin foam is an average of diameters of 50 cells measured by an optical microscope (magnification: 50). The diameter of a cell means a major axis.

<Resin Member>

The resin member is a member composed of a resin, different from the above resin foam. The resin contained in the resin member is a polycarbonate resin, a polystyrene resin, a polyphenylene ether resin, an acrylonitrile/butadiene/styrene resin, or a styrene/acrylonitrile copolymer resin (SAN). The polystyrene resin may be either high impact polystyrene (HIPS) of general purpose polystyrene (GPPS). Over the resin member containing the above resin, influences of the resin foam formed by using the blowing agent containing 1224yd are reduced as compared with a case where other blowing agent is used, and desired effects are obtained.

"Different from the above resin foam" means that the resin member is not a resin foam formed by using the blowing agent containing 1224yd, and the resin member is a member containing no 1224yd.

The resin member may be a foam or may not be a foam.

As specific examples of the shape of the resin member, a sheet, a plate, a rod, a tube, spheres (beads) and a combination thereof may be mentioned.

<Composite>

The composite of the present invention comprises the above resin foam and the resin member.

The composite of the present invention may comprise only one type of the resin foam or may comprise two or more types of the resin foams.

Further, the composite of the present invention may comprises one type of the resin member or may comprises two or more types of the resin members.

Further, the composite of the present invention may contain two or more pieces of the resin foams, for example, the composite may have two pieces of the resin foams to sandwich the resin member.

Further, the composite of the present invention may contain two or more pieces of the resin members, for example, the composite may have two pieces of the resin members to sandwich the resin foam.

In the composite of the present invention, the resin foam and the resin member may be disposed adjacent to each other (in direct contact with each other), or may be disposed via the after-described other member (for example, an adhesion layer).

The resin foam and the resin member may be disposed as spaced out.

The composite may contain a member other than the resin foam and the resin member.

For example, the composite may contain other organic member including a resin other than the resin contained in the resin member, a rubber and an elastomer.

As specific examples of other resin included in other organic member, a polyolefin resin, a polyvinyl chloride resin, a (meth)acrylic resin, a polyester resin, a modified polyphenylene ether resin, a polyacetal resin, a polyether imide resin, a polyethersulfone resin, a polyamide resin, a polysulfone resin, a polyether ether ketone resin, a polyether ketone resin, a polyvinyl alcohol resin, a polyvinylidene chloride resin, a polytetrafluoroethylene, a polyurethane resin, a phenolic resin, a melamine resin and a urea resin may be mentioned.

As specific examples of the rubber included in other organic member, natural rubber, silicone rubber, urethane rubber, butyl rubber, chloroprene rubber, chlorosulfonated polyethylene rubber, nitrile rubber, fluorine rubber, ethylene propylene diene rubber, hydrogenated nitrile rubber, vinylidene fluoride rubber, tetrafluoroethylene/propylene rubber, tetrafluoroethylene/perfluorovinyl ether rubber and fluorosilicone rubber may be mentioned.

As specific examples of the elastomer included in other organic member, an olefin elastomer, a polyvinyl chloride elastomer, a polystyrene elastomer, a polyester elastomer and a polyamide elastomer may be mentioned.

The other member may be a member containing an inorganic substance.

As specific examples of the inorganic substance, a metal, a carbon material and glass may be mentioned.

As described above, the resin foam and the resin member may be disposed via other member, and in such an embodiment, as other member, a member which functions as a so-called adhesion layer may be used. An adhesion layer is a layer which improves adhesion between members. As specific examples of the adhesion layer, a pressure-sensitive adhesive layer and an adhesive layer may be mentioned, and both contain a resin.

The shape of the composite depends on the shape of the resin foam and the shape of the resin member and may, for example, be a sheet, a plate, a rod, a tube, spheres (beads) or a combination thereof.

Further, the relation of the disposition of the resin foam and the resin member in the composite is not limited, and an optimum disposition is selected depending upon the application.

Figure 2:
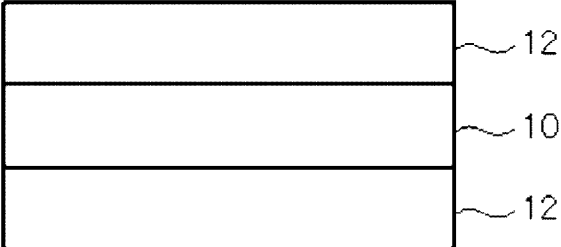
FIG. 2 is a view schematically illustrating another example of the resin foam and the resin member in the composite.

For example, as shown in FIG. 1, a resin foam 10 in a layer form and a resin member 12 in a layer form may be laminated adjacent to each other to constitute a laminate (composite). Further, as shown in FIG. 2, a resin foam 10 in a layer form may be sandwiched between two resin members 12 each in a layer form to constitute a laminate (composite).

Further, the resin foam may be disposed to cover at least a part of (preferably the entire) surface of the resin member in a predetermined shape (for example, a sheet, a plate, spheres or a tube).

As a method for producing the composite, various known methods may be employed.

For example, the resin foam and the resin member are laminated and as the case requires, contact bonded with heating e.g. by pressing, to prepare the composite.

Further, for example, as described above, in a case of forming the resin foam by spray method, the raw material for the resin foam may be sprayed over the resin member to form the resin foam so as to cover at least a part of the surface of the resin member to prepare a composite. Otherwise, the raw material may be injected between two sheets of resin members and expanding the raw material to prepare a composite having the resin foam sandwiched between the resin members.

The foam may be used for various applications, for example, for packaging materials, packing materials, buffer materials, heat insulating materials, heat retaining materials, cold retaining materials, sound deadening materials, sound absorbing materials, sound insulating materials, damping materials, building materials, cushioning materials, materials and containers.

More specifically, marine members, vehicle members (e.g. automobile damping materials, automobile sound absorbing materials and automobile interior members), building members (e.g. building heat insulating materials, building joint materials, sealing strip materials), civil engineering members (e.g. building aging materials), electric apparatus members (e.g. refrigerator members (freezer/refrigerator panels), refrigerated counter members, air conditioning members, acoustic equipment members), medical members (e.g. medical product members, care product members, rehabilitation product members), aircraft members, furniture members (e.g. bedding members, chair members), house members, industrial product members (e.g. damping pad members, air sealing members, packing members, mask members and filter members), packaging members, agricultural members and stationery members may be mentioned.

EXAMPLES

Now, the present invention will be described in further detail with reference to Examples. However, it should be understood that the present invention is by no means restricted thereto. Ex. 1 to 9, 11 to 17 are Examples of the present invention, and Ex. 10 and 18 are Comparative Examples.

<Influence Over Outer Appearance of Other Resin (Outer Appearance Evaluation)>

As a resin plate, a polycarbonate resin plate (PC plate), a polystyrene resin plate (PS plate), a polyphenylene ether resin plate (PPE plate) and an acrylonitrile/butadiene/styrene resin plate (ABS plate) were prepared. From each resin plate, a test specimen (25 mm×30 mm×2 mm) for measurement was prepared. The test specimen was put in a PYREX (registered trademark) inner tube and inserted into a SUS316 pressure resistant container (maximum allowable working temperature: 300° C., maximum allowable working pressure: 20 MPa) having an internal volume of 200 cc. The pressure resistant container was sealed and evacuated of air. Then, the composition (80 g) as illustrated in each Ex. was put in the pressure resistant container. The pressure resistant container was put in a constant temperature chamber kept at 50° C. and left at rest for 120 hours. 120 hours later, the pressure resistant container was taken out from the constant temperature chamber, the test specimen was taken out from the pressure resistant container, and the outer appearance of the test specimen was observed and evaluated based on the following standards.

A: No change observed.

B: Slight discoloration or slight deformation (including swelling) observed but practically ignorable level.

C: Distinct discoloration or distinct deformation (including swelling) observed at practically problematic level.

<Stability Test>

As a metal piece, one iron piece (SS400, 25 mm×30 mm×3.2 mm), one copper piece (25 mm×30 mm×2 mm) and one aluminum piece (25 mm×30 mm×2 mm) were prepared. These metal pieces were put together in a PYREX (registered trademark) inner tube. The inner tube containing the metal pieces was put into a SUS316 pressure resistant container (maximum allowable working temperature: 300° C., maximum allowable working pressure: 20 MPa) having an internal volume of 200 cc, and the pressure resistant container was evacuated of air. Then, the composition (60 g) as illustrated in each Ex. was put. The pressure resistant container was placed in a hot air circulating constant temperature chamber and left at rest in a constant temperature state at 175° C. for 14 days. 14 days later, the pressure resistant container was taken out from the constant temperature chamber, and the acid content was analyzed with respect to the composition as follows.

The pressure resistant container after the test was left at rest to room temperature. To the pressure resistant container at room temperature, four absorbing bottles each containing 100 ml of pure water connected in series, were connected, and a valve of the pressure resistant container was gradually opened to introduce the composition into the water in the absorbing bottles so that the acid content contained in the composition was extracted. The water in the first and the second absorbing bottles after the extraction was put together and titrated with a 1/100N-NaOH alkali standard solution using one drop of an indicator (BTB: bromothymol blue). Further, the water in the third and the fourth absorbing bottles were put together and titrated similarly as a blank. From the measured value and the blank value, the concentration of the acid content contained in the composition after the test was obtained as the HCl concentration and evaluated based on the following standards. The results are shown in Table 1.

A: acid content (calculated as HCl) 3 mass ppm or lower

B: acid content (calculated as HCl) higher than 3 mass ppm and 5 mass ppm or lower C: acid content (calculated as HCl) higher than 5 mass ppm

Ex. 1 to 10

The compositions as illustrated in Table 1, and the resin plates (PC plate, PS plate, PPE plate, ABS plate) as illustrated in Table 1 were prepared, and the above <Influence over outer appearance of other resin (outer appearance evaluation)> and <Stability test> were conducted.

As the composition, a composition having the blowing agent selected from the group consisting of 1224yd(Z), 1224yd(E) and 1233zd(E) in the proportion as identified in Table 1 was prepared. In Table 1, the respective columns represent the mass ratios (mass %) of the respective components to the total amount of 1224yd(Z), 1224yd(E) and 1233zd(E).

TABLE 1

| | Composition | | | Outer appearance | | | | |
|---|---|---|---|---|---|---|---|---|
| | 1224 yd(Z) | 1224yd (E) | 1233zd (E) | PC plate | PS plate | PPE plate | ABS plate | Stability test |
| 1 | 95% | 5% | | A | A | A | A | A |
| 2 | 90% | 10% | | A | A | A | A | A |
| 3 | 80% | 20% | | A | A | A | A | A |
| 4 | 70% | 30% | | A | A | A | A | B |
| 5 | 50% | 50% | | A | A | A | A | B |
| 6 | 40% | 60% | | A | A | A | A | B |
| 7 | 30% | 70% | | A | A | A | A | B |
| 8 | 20% | 80% | | B | B | B | B | C |
| 9 | 100% | | | B | B | B | B | C |
| 10 | | | 100% | C | C | C | C | C |

As shown from the outer appearance evaluation results in Table 1, it was confirmed that 1224yd hardly influences any resin.

Particularly, from the comparison between Ex. 1 to 9, it was confirmed that influence over other resin is less when the content of 1224yd(Z) to the total amount of 1224yd(Z) and 1224yd(E) is 30 mass % or more.

Further from the comparison between Ex. 1 to 9, it was confirmed that the composition is excellent in stability when the content of 1224yd(Z) to the total amount of 1224yd(Z) and 1224yd(E) is 30 mass % or more (preferably 75 mass % or more).

Further, results with the same tendencies as in Ex. 1 are obtained when cyclopentane, n-pentane, isopentane, isobutane, n-butane or trans-1,2-dichloroethylene is used instead of 1224yd(E) in Ex. 1.

Ex. 11 to 18

The above evaluation of influence over outer appearance of other resin is carried out using a liquified composition as identified in each Ex. in Table 2. As 1224yd in Table, one with an isomer ratio (mass ratio) of 1224yd(Z)/1224yd(E) =99.4/0.6 is used.

In Table 2, the respective columns represent the mass ratios (mass %) of the respective components to the total amount of 1224yd, cyclopentane and 1233zd(E).

TABLE 2

| | Composition | | | Outer appearance | | | |
|---|---|---|---|---|---|---|---|
| | 1224yd | Cyclopentane | 1233zd (E) | PC plate | PS plate | PPE plate | ABS plate |
| 11 | 100% | | | A | A | A | A |
| 12 | 90% | 10% | | A | A | A | A |
| 13 | 80% | 20% | | A | A | A | A |
| 14 | 70% | 30% | | A | A | A | A |
| 15 | 50% | 50% | | B | B | B | B |
| 16 | 30% | 70% | | B | B | B | B |
| 17 | 20% | 80% | | B | B | B | B |
| 18 | | 10% | 90% | C | C | C | C |

As shown in Table 2, it is confirmed that 1224yd hardly influences any resin.

Particularly, from the comparison between Ex. 11 to 17, it is confirmed that influence over other resin is less when the content of 1224yd(Z) to the total amount of 1224yd(Z) and cyclopentane is 70 mass % or more.

Further, results with the same tendencies as in Ex. 12 to 14 are obtained when n-pentane, isopentane, isobutane, n-butane or trans-1,2-dichloroethylene is used instead of cyclopentane in Ex. 12 to 14.

<Evaluation of Composite>

With reference to the method disclosed in Example 1 of JP-A-2015-105340, resin foams 1 to 10 (polyurethane foams) are obtained by using each of the compositions as identified in Ex. 1 to 10 as the blowing agent.

Further, separately, resin plates i.e. PC plates, PS plates, PPE plates and ABS plates were prepared.

The PC plates are laminated so as to sandwich the resin foam 1 to obtain a composite (see FIG. 2) having the PC plate, the resin foam 1 and the PC plate laminated in this order. Further, using the PS plates, the ABS plates or the PPE plates instead of the PC plates, composites having the resin foam 1 sandwiched between the respective plates are prepared.

Further, using the resin foams 2 to 10 instead of the resin foam 1, composites having the resin foams 2 to 10 sandwiched between the respective resin plates are obtained.

These composites are left to stand at 70° C. for 3 weeks and the outer appearance of the resin plates is observed, whereupon results with the same tendencies as the results in Table 1 are confirmed. For example, with respect to the composite having the resin foam 1 (the resin foam formed by using the composition in Ex. 1 as the blowing agent) and the PC plates laminated, substantially no change is observed on the PC plates, and with respect to the composite having the resin foam 10 (the resin foam formed by using the composition in Ex. 10 as the blowing agent) and the PC plates laminated, discoloration is observed on the PC plates.

Further, integral skin foams 1 to 10 are prepared in accordance with the description of Example 1A in JP-A-2018-507956 except that the compositions in Ex. 1 to 10 are used as the blowing agent, and in accordance with the above <Evaluation of composite> except that the obtained integral skin foams are used instead of the resin foams 1 to 10, composites are prepared, and the outer appearance of the resin plates is observed. Results with the same tendencies as the results in Table 1 are confirmed.

The entire disclosures of Japanese Patent Application No. 2019-183589 filed on Oct. 4, 2019 and Japanese Patent Application No. 2020-076632 filed on Apr. 23, 2020 including specifications, claims, drawings and summaries are incorporated herein by reference in their entireties.

REFERENCE SYMBOLS

10 resin foam
12 resin member

What is claimed is:

1. A composite, comprising:
a resin foam formed by using a blowing agent comprising a 1-chloro-2,3,3,3-tetrafluoropropene;
a resin member different from the resin foam, comprising a resin selected from the group consisting of a polycarbonate resin, a polyphenylene ether resin, an acrylonitrile/butadiene/styrene resin, and a styrene/acrylonitrile copolymer resin; and
a metal,
wherein the 1-chloro-2,3,3,3-tetrafluoropropene is selected from the group consisting of (Z)-1-chloro-2,3,3,3-tetrafluoropropene and (E)-1-chloro-2,3,3,3-tetrafluoropropene,
a content of (Z)-1-chloro-2,3,3,3-tetrafluoropropene relative to a total mass of 1-chloro-2,3,3,3-tetrafluoropropene is 80 mass % or more, and
wherein the metal comprises at least one selected from the group consisting of aluminum, copper, and iron.

2. The composite according to claim 1, wherein the resin foam comprises a thermosetting resin foam selected from the group consisting of a polyurethane foam, a polyisocyanurate foam, and a phenolic resin foam.

3. The composite according to claim 1, wherein the resin foam comprises a thermoplastic resin foam comprising at least one member selected from the group consisting of a polycarbonate resin, a polystyrene resin, a polyphenylene ether resin, an acrylonitrile/butadiene/styrene resin, a polyolefin resin, a polyvinyl chloride resin, a (meth)acrylic resin, a polyester resin, a modified polyphenylene ether resin, a polyacetal resin, a polyether imide resin, a polyethersulfone resin, a polyamide resin, a polysulfone resin, a polyether ether ketone resin, and a polyether ketone resin.

4. The composite according to claim 1, wherein the composite comprises at least two resin foams.

5. The composite according to claim 1, wherein the resin foam comprises two or more resins selected from the group consisting of a polycarbonate resin, a polystyrene resin, a polyphenylene ether resin, an acrylonitrile/butadiene/styrene resin, and a styrene/acrylonitrile copolymer resin.

6. The composite according to claim 1, wherein the blowing agent further comprises at least one compound selected from the group consisting of a hydrofluoroolefin, a hydrochlorofluoroolefin other than 1-chloro-2,3,3,3-tetrafluoropropene, a hydrochloroolefin, a chlorofluoroolefin, a fluoroolefin, a chloroolefin, an olefin, a hydrofluorocarbon, a hydrochlorocarbon, a hydrochlorofluorocarbon, a chloro-fluorocarbon, a fluorocarbon, a chlorocarbon, a hydrocarbon, a hydrofluoroether, carbon dioxide, an organic acid, an alcohol, an ether, an aldehyde, a ketone, water, and nitrogen.

7. The composite according to claim 1, wherein the blowing agent further comprises at least one member selected from the group consisting of 1-chloro-3,3,3-trifluoropropene, 1,1,1,4,4,4-hexafluoro-2-butene, 1,3,3,3-tetrafluoropropene, cyclopentane, n-pentane, isopentane, isobutane, n-butane, trans-1,2-dichloroethylene, carbon dioxide, and nitrogen.

8. The composite according to claim 2, wherein the resin foam comprises a polyurethane foam obtained from a polyol having an average hydroxy value of 200 to 700 mg KOH/g.

9. The composite according to claim 1, wherein the content of (Z)-1-chloro-2,3,3,3-tetrafluoropropene relative to the total mass of 1-chloro-2,3,3,3-tetrafluoropropene is 99 mass % or more.

10. The composite according to claim 1, wherein the 1-chloro-2,3,3,3-tetrafluoropropene is present in the blowing agent in an amount of 30 to 100 mass % relative to a total mass of the blowing agent.

11. The composite according to claim 1, wherein the resin foam has a density of 0.02 to 0.96 g/cm$^3$.

12. The composite according to claim 1, further comprising:
    an adhesion layer disposed between the resin foam and the resin member.

13. The composite according to claim 1, further comprising:
    a member disposed between the resin foam and the resin member.

14. The composite according to claim 4, wherein the thermosetting resin foam is the polyurethane foam.

15. The composite according to claim 3, wherein the thermoplastic resin foam comprises the polycarbonate resin.

16. The composite according to claim 5, wherein the resin foam comprises the polycarbonate resin and the acrylonitrile/butadiene/styrene resin.

17. The composite according to claim 8, wherein the blowing agent further comprises 1-chloro-3,3,3-trifluoropropene.

18. The composite according to claim 1, wherein the metal comprises aluminum.

19. The composite according to claim 1, wherein the resin member has a shape of a sheet or a plate.

20. The composite according to claim 1, wherein the resin member has a shape of a rod, a tube, or spheres.

*   *   *   *   *